United States Patent [19]

Sugita et al.

[11] Patent Number: 5,243,606
[45] Date of Patent: Sep. 7, 1993

[54] APPARATUS AND METHOD FOR DETECTING FAILURE OF AN EXTERNAL DEVICE BY A MICROCOMPUTER

[75] Inventors: Mitsuru Sugita; Kikuo Muramatsu, both of Itami, Japan

[73] Assignee: Mitsubishi Denki Kabushiki Kaisha, Tokyo, Japan

[21] Appl. No.: 455,489

[22] Filed: Dec. 21, 1989

[30] Foreign Application Priority Data

Apr. 28, 1989 [JP] Japan .................. 1-111141

[51] Int. Cl.⁵ .................. H04L 1/08; G06F 11/00
[52] U.S. Cl. .................. 371/69.1; 371/67.1; 371/29.1
[58] Field of Search .......... 371/29.1, 16.5, 69.1, 371/16.3, 24, 25.1, 26, 70, 67.1; 364/424.03, 424.04

[56] References Cited

U.S. PATENT DOCUMENTS

| 3,046,524 | 12/1959 | Johnson et al. | 371/29.1 |
| 3,707,714 | 12/1972 | Plumley | 371/29.1 |
| 3,881,094 | 4/1975 | Taylor et al. | 364/424.03 |
| 4,099,668 | 7/1978 | Feilchenfeld et al. | 371/22.1 |
| 4,283,766 | 8/1981 | Snyder et al. | 364/525 |
| 4,712,213 | 12/1987 | Warwick et al. | 371/70 X |
| 4,817,418 | 4/1989 | Asami et al. | 371/29.1 |
| 4,916,698 | 4/1990 | McCann | 371/16.3 |
| 5,048,017 | 9/1991 | Breneman | 371/62 |
| 5,095,483 | 3/1992 | Dubler et al. | 371/25.1 |

FOREIGN PATENT DOCUMENTS

| 0133652 | 8/1984 | Japan | 371/29.1 |
| 0017545 | 1/1985 | Japan | 371/29.1 |

OTHER PUBLICATIONS

Tanenbaum, *Structured Computer Organization*, Prentice-Hall, 1984, pp. 74-75, 83-87.

Primary Examiner—Robert W. Beausoliel, Jr.
Assistant Examiner—Allen M. Lo
Attorney, Agent, or Firm—Townsend and Townsend Khourie and Crew

[57] ABSTRACT

The microcomputer of the invention comprises a flip-flop which repeats setting and resetting of a monitor signal. The monitor signal is delivered from an external device in response to a PWM output signal for driving the external device. The flip-flop sets and resets at the front edge, of the monitor signal. The invention detects a failure of the external device according to the presence or absence of inversion of its held value. Hence, the failure of the external device operating at high speeds can be reliably detected by the microcomputer of the invention.

9 Claims, 9 Drawing Sheets

APPARATUS AND METHOD FOR DETECTING FAILURE OF AN EXTERNAL DEVICE BY A MICROCOMPUTER

BACKGROUND OF THE INVENTION

1. Field of the Invention

This invention relates to a microcomputer of a one-chip type for controlling external devices, and more particularly to a function for detecting microcomputer processing a failure of externally connected devices.

2. Description of Related Art

One-chip microcomputers are widely used in control of automobiles, electric household appliances, etc. When using the one-chip microcomputer for control in a field where high reliability is required, detection of a failure is very important, and it is desired that a failure be detected and corrected by the microcomputer as promptly as possible. In the control of an automobile automatic transmission, if an electromagnetic valve, which is one of the external devices, should fail to operate normally due to an abnormality such as disconnection of a wire, control of the hydraulic system is disabled, and the transmission gear may malfunction or break down. Therefore, when a microcomputer is used in this control, a failure detection function such as that referred to above is particularly important.

Figure 1:
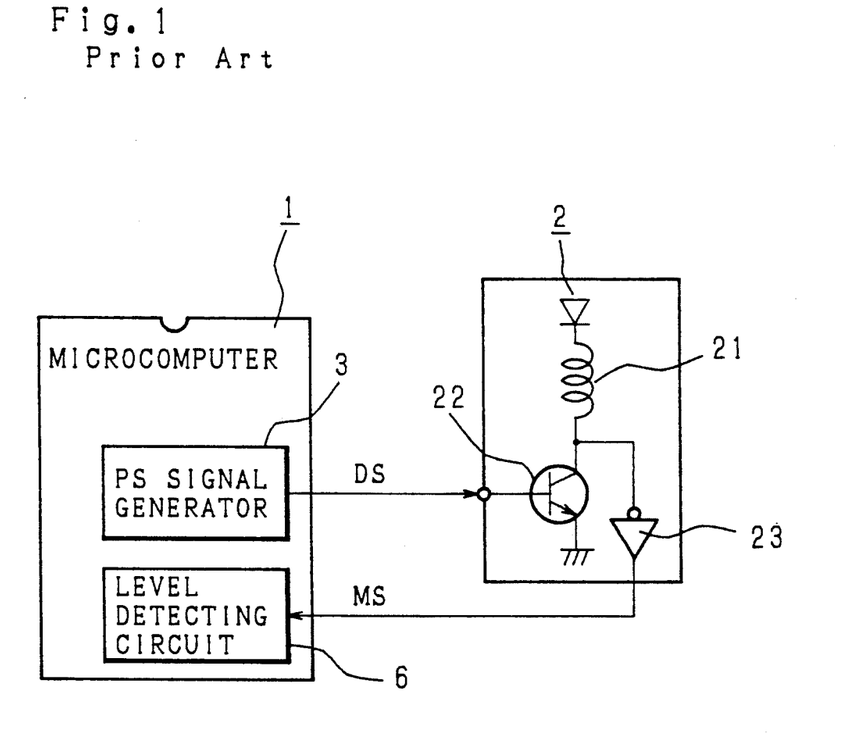
FIG. 1 is a circuit diagram showing the structure of a failure detecting system of a conventional microcomputer.

FIG. 1 is a schematic block diagram showing the structure of a failure detecting system of a conventional microcomputer used in control of an electromagnetic valve. In this block diagram, numeral 1 denotes a one-chip microcomputer for controlling the automatic transmission of an automobile, and this microcomputer 1 comprises a PS signal generator 3 which generates and delivers a pulse modulation signal PS for driving an electromagnetic valve 2. The electromagnetic valve 2 is intended to control the automatic transmission by regulating the feed direction of oil pressure. The electromagnetic valve 2 comprises an emitter-grounded npn transistor 22 which receives, as an input, the pulse modulation signal PS at its base and turns on and off the collector current accordingly. Valve 2 also includes an excitation coil 21 of which one end is connected to a power source and the other end is connected to the collector. The collector current is given to a level detecting circuit 6 of the microcomputer 1 as a monitor signal MS for showing the state of the electromagnetic valve 2 through an inverter 23. The level detecting circuit 6 checks the level of the inputted monitor signal MS, and detects trouble in the electromagnetive valve 2.

The operation of the conventional microcomputer is described below. In order to operate the electromagnetic valve 2, the microcomputer 1 gives a pulse modulation signal PS to the electromagnetic valve 2. When the electromagnetic valve 2 functions normally, a monitor signal MS is actuated, and the microcomputer 1 detects a failure by checking the level of the monitor signal MS.

Figure 2:
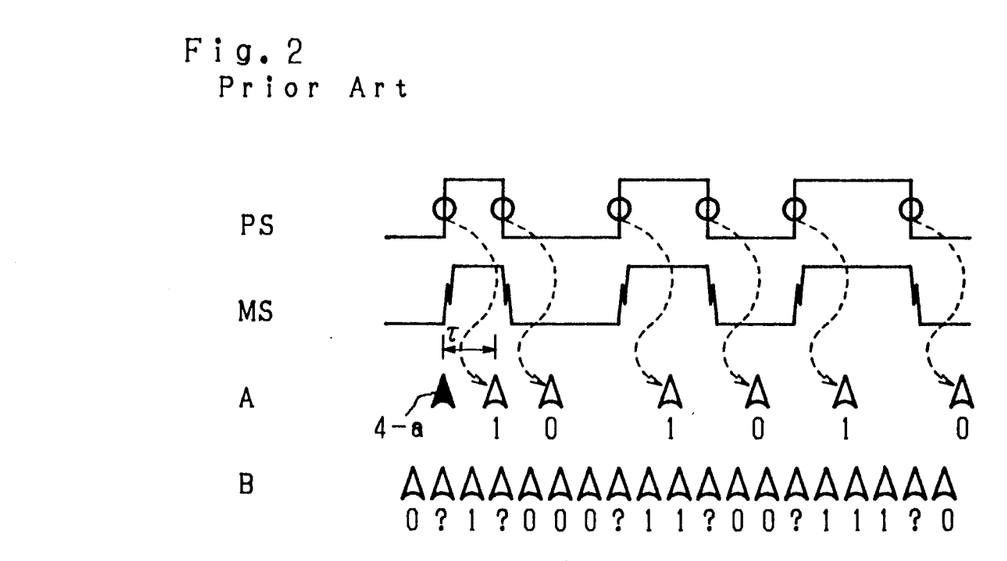
FIG. 2 and FIG. 3 are timing charts of the failure detecting operation in the conventional microcomputer.

The above-described process of detecting a failure is shown in the timing chart of FIG. 2. In this chart, the pulse modulation signal PS, monitor signal MS, and level detection timing are shown in timed relation. As stated above, the failure of the electromagnetic valve 2 is detected by investigating the level of the monitor signal MS, but the monitor signal MS is often delayed at its changing point as indicated by 4a in FIG. 2, therefore, if the level of the monitor signal MS is judged at the changing point of the pulse modulation signal PS, the result tends to be insecure. Accordingly, hitherto, either the monitor timing system A or B as shown in the chart has been employed.

In the monitor timing system A, the monitor action is delayed by a waiting time $\tau$ by software or by exclusive hardware, from the changing point of the pulse modulation signal PS until the stabilization of the monitor signal MS. As a result of the monitoring, the failure is detected by seeing whether or not the level is different from the result of the previous investigation.

In the monitor timing system B, the monitor signal MS is investigated at every specific time interval, and it is determined if a result of a different level is obtained after several monitoring times.

Figure 3:
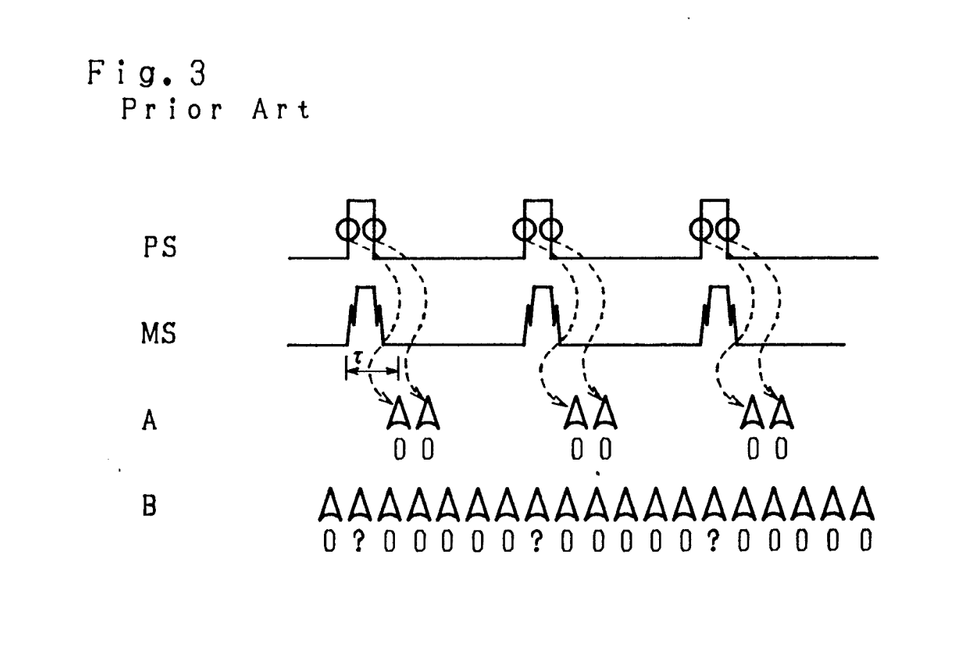

Microcomputer controls tend to be much higher in speed recently, and the pulse modulation signal PS shown in FIG. 2 is also increased in speed in order to raise controlling accuracy. For example, in the case of a pulse modulation signal PS with a shorter pulse width than the waiting time t as shown in FIG. 3, it is not possible according to the conventional monitor timing system A to monitor at the optimum timing if the monitor signal MS is monitored by the same conventional waiting time $\tau$. Therefore, normal operation cannot be detected. When the waiting time $\tau$ is shortened, although a detectable timing is obtained, the instability time and pulse width vary due to the delay of the monitor signal MS, etc. in every external electromagnetic valve 2, and therefore the waiting time $\tau$ is required to be variable. In the circumstances above, if it is attempted to detect a failure at high speeds by the conventional method, the program becomes complicated when monitor timing is generated by the software, rendering the load heavier. Meanwhile, when the monitor timing is realized by hardware, it leads to an increase in the number of circuits. Even in the complete absence of the instability time, if the pulse width becomes shorter, the timing for executing monitoring of the monitor signal MS is limited, and the load for executing monitoring is increased. The same holds true with the case of the monitor timing system B. The main routine becomes lengthy, due to the increase in load of the software, and the time interval of monitorings of the monitor signal MS tends to be longer. It is hence hard to monitor the pulse width which tends to be shorter.

SUMMARY OF THE INVENTION

This invention is intended to solve the above-discussed problems of the prior art, and it is hence a primary object of the invention to provide a microcomputer capable of detecting a failure of an external device reliably even if a monitor signal is higher in speed, by installing a flip-flop which repeats setting and resetting at the front edge of the monitor signal.

It is another object of the invention to provide a microcomputer capable of reducing the load of the software when detecting failures, by installing a flip-flop which repeats setting and resetting at the front edge of the monitor signal.

The above and further objects and features of the invention will more fully be apparent from the following detailed description with accompanying drawings.

DESCRIPTION OF THE PREFERRED EMBODIMENTS

Referring now to the drawings, some of the embodiments of the invention are described in detail below. First in FIG. 4, numeral 1 denotes a microcomputer of the invention, which comprises a PS signal generator 3 which generates and delivers a pulse modulation signal PS thereby to drive an electromagnetic valve 2 so as to control the oil pressure of a transmission gear which is not shown. The electromagnetic valve 2 is intended to control the automatic transmission by regulating the feed direction of the oil pressure, and it comprises an emitter-grounded npn transistor 22 which receives, as an input, the pulse modulation signal PS at its base and turns on and off collector current accordingly, and an excitation coil 21 of which one end is connected to the power source and the other end is connected to a collector. The excitation coil 21 is designed to move a spool (not shown) of the electromagnetic valve 2, and it is excited or de-excited by the ON or OFF state of the transistor 22.

Figure 4:
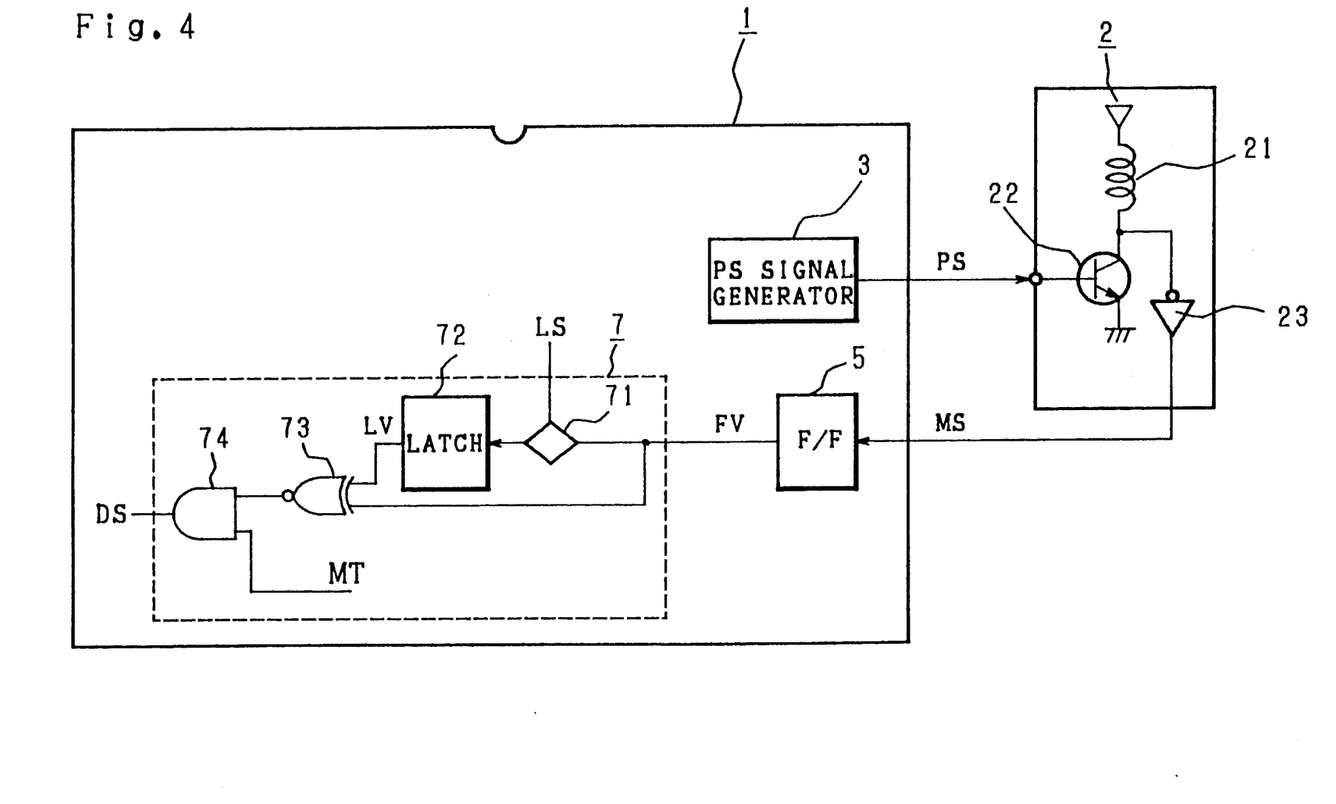
FIG. 4 is a circuit diagram showing the structure of a failure detecting system of a microcomputer according to one embodiment of the invention.

The collector current is applied through an inverter 23, to a toggle flip-flop circuit (hereinafter referred to as an F/F) 5 which is a means for holding signals provided to the microcomputer 1, such as a monitor signal MS showing the state of the electromagnetic valve 2, to be held therein. The F/F 5 inverts a held value FV at the leading edge of a mode signal MS. The held value FV of the F/F 5 is taken into a latch 72 through a transfer gate 71 at an input time provided by a latch control signal LS relating to the mode signal MS. FV is also given to an exclusive-NOR gate 73. At the other input of the exclusive-NOR gate 73, an output signal LV of a latch 72 is added, and the output signal of the exclusive NOR gate 73 and the monitor timing signal MT are given to an AND gate 74. The monitor timing signal MT is of the same period as the pulse modulation signal PS, and a pulse is delivered at a time before the latch control signal LS. The output signal of the AND gate 74 is regarded as a failure detection signal DS. The presence or absence of a failure is judged in accordance with the H or L state of this signal. A judging circuit 7 is constructed of such transfer gate 71, latch 72, exclusive-NOR gate 73 and AND gate 74, as a failure detecting means.

Figure 5:
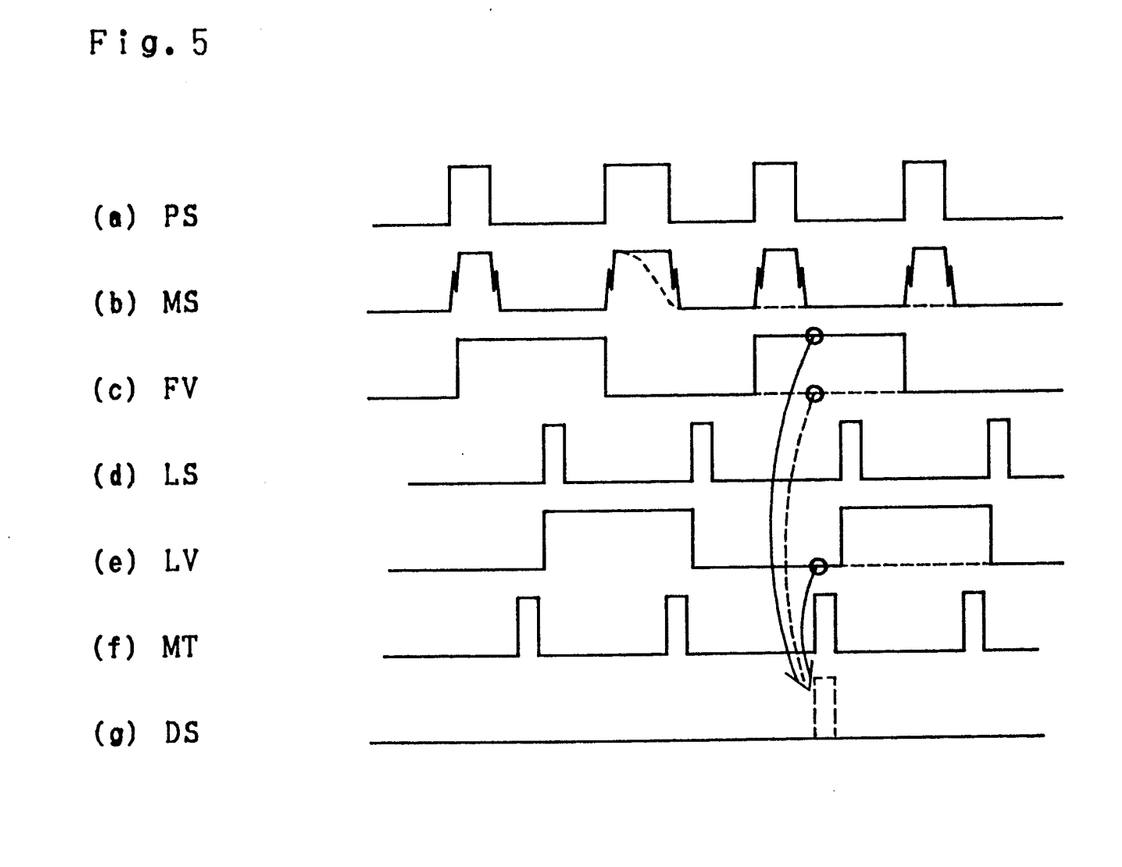
FIG. 5 is a timing chart of the failure detecting operation of the microcomputer of the invention.

The operation for detecting a failure is explained below. FIG. 5 is a timing chart showing the procedure for failure detection by the microcomputer of the present invention. In the example of FIG. 5, a pulse width modulation (PWM) signal is used as the pulse modulation signal PS. To operate the electromagnetic valve 2, the microcomputer 1 gives the pulse modulation signal PS of a specific period to the electromagnetic valve 2. The electromagnetic valve 2, depending on whether the pulse modulation signal PS is H or L, turns on or off the collector current of the transistor 22, and excites or de-excites the excitation coil 21. This collector current is inverted by the inverter 23, and is given to the F/F 5 as the mode signal MS. The F/F 5 inverts its held valve FV at the rise of the mode signal MS, and delivers the held value FV to the latch 72 through the transfer gate 71, and also to one end of the exclusive-NOR gate 73. The transfer gate 71 is turned on at the input timing of the latch control signal LS, and gives the held value FV to the latch 72. The output signal LV of the latch 72 is delivered to the other end of the exclusive-NOR gate 73, thereby to carry out the exclusive NOR calculation with the held value FV fed at one end of the gate 73. The AND calculation of the signal resulting from the above exclusive NOR calculation and the monitor timing signal is performed in the AND gate 74. By the detection signal DS delivered from the AND gate 74, the presence or absence of a failure of the electromagnetic valve 2 is detected. That is, while the electromagnetic valve 2 is normally operating, the held value FV is inverted at the rise of the monitor signal, whereas, if not operating normally, the monitor signal MS does not rise, and the signal is not inverted as indicated by a broken line in FIG. 5(c). Therefore, by latching the held value FV by the latch 72 one period before and judging whether or not this output signal LV and the held value FV are equal to each other at every monitor timing, the presence or absence of a failure of the electromagnetic valve 2 can be detected. Thus, in the instant embodiment, it is enough to monitor the output of the exclusive-NOR gate 73 by generating a monitor timing signal only once within the period of the pulse modulation signal PS.

Figure 6:
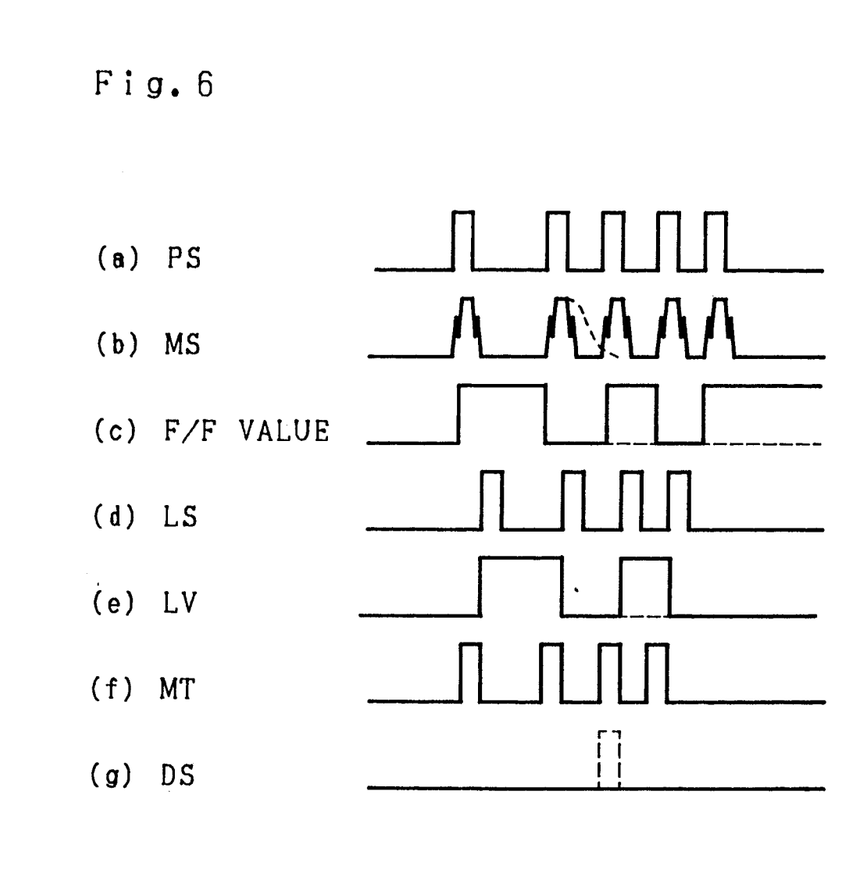
FIG. 6 is a timing chart of the failure detecting operation of a microcomputer according to another embodiment of the invention.

Another embodiment of the invention is described below. In another embodiment, a high frequency pulse frequency modulation (PFM) signal is used, as the pulse modulation signal PS, and the rest is the same as in the foregoing embodiment. FIG. 6 is a timing chart for explaining the failure detecting operation of this embodiment. In this case, too, similarly as in the preceding embodiment, it is enough to monitor the output of the exclusive-NOR gate 73 only once within the period of the pulse modulation signal PS, and it is consequently possible to cope with the tendency to increase in speed of the PFM signal.

Figure 7:
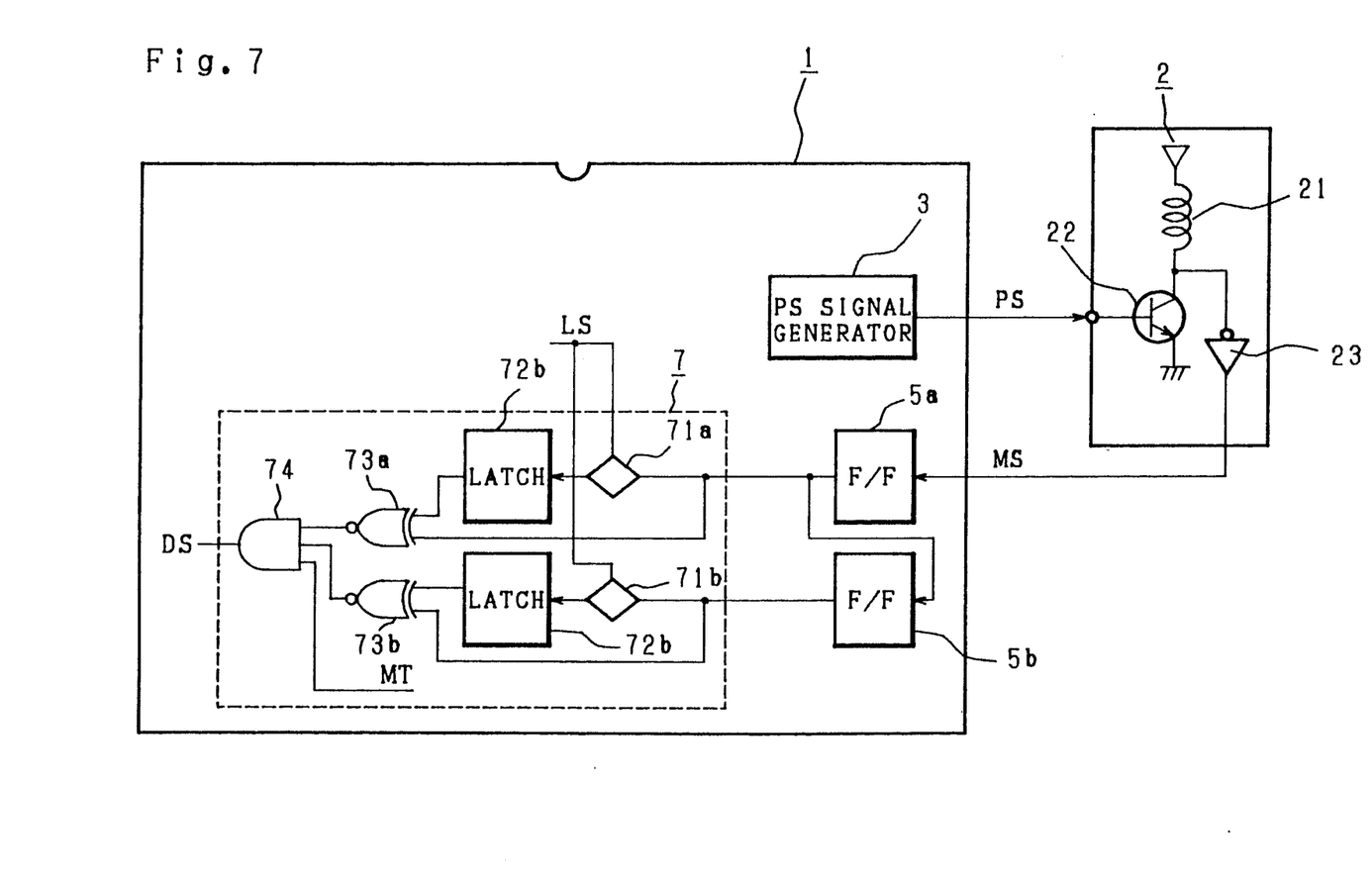
FIG. 7 is a circuit diagram showing the structure of a failure detecting system of a microcomputer according to a further different embodiment of the invention.

A further different embodiment is explained next. FIG. 7 is a block diagram showing the structure of a microcomputer according to the further embodiment, in which the F/F 5 is provided in two stages, namely, 5a, 5b, so as to cope with the trend toward high speeds of the pulse modulation signal PS. A held value FVa of the F/F 5a is given to a transfer gate 71a and also to the F/F 5b. Therefore, the held value FVb is a frequency-divided portion of the held value FVa. The held value FVa is applied to a latch 72a through the transfer gate 71a, and is further given to one input of an exclu- NOR gate 73a. At the other end of the exclusive-NOR gate 73a, an output signal LVa of the latch 72a is given. The held value FVb is also, similar to the held value FVa, given to an exclusive-NOR gate 73b. The output signals of the exclusive-NOR gates 73a, 73b, and the monitor timing signal MT are given to the AND gate 74. By their AND, that is, the detection signal DS, the presence or absence of a failure of the electromagnetic valve 2 is detected. The period of the timing signal MT and the latch control signal given to the transfer gates 71a, 71b is three times as long as the period of the pulse modulation signal PS.

Figure 8:
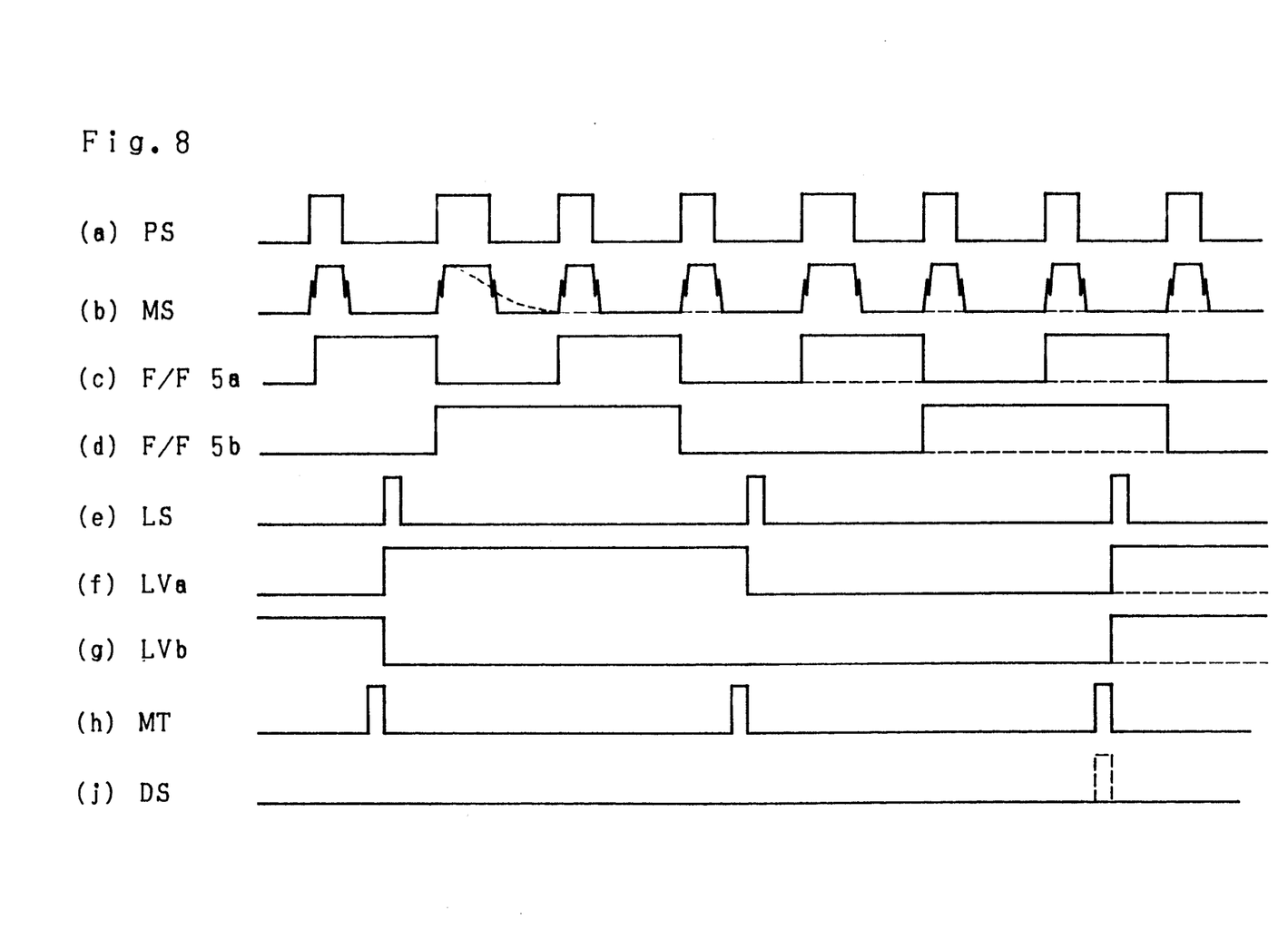
FIG. 8 is a timing chart of the failure detecting operation of the microcomputer of FIG. 7.

Referring to a timing chart shown in FIG. 8, the failure detecting operation of the further embodiment is explained below. When a monitor signal MS is outputted from the electromagnetic valve 2, the held valve FVa of the F/F 5a is inverted at the rise of the signal MS. In consequence, the exclusive NOR of the held value FVa and the value of the output signal LVa of the held value latched three periods before the pulse modulation signal PS, and that of the held value FVb and the value of the output signal LVb of the held value latched three periods before the pulse modulation signal PS are calculated individually, and thus the presence or absence of a failure of the electromagnetic valve 2 is detected by the detection signal DS which is the AND of these signals and the monitor timing signal MT. For example, as indicated by broken lines in FIGS. 8(c) and (d), if the monitor signal MS is not outputted due to the disconnection or other cause, the held values FVa, FVb are not inverted, and the held values FVa and FVb, and output signals LVa and LVb become respectively equal to each other, whereby the detection signal DS becomes H. In the manner as described hereinabove, by arranging the F/F 5 in two stages, it is possible to detect a failure by a single monitoring action in every three periods of the pulse modulation signal PS, so that it is possible to cope with the trend toward high speeds of the pulse modulation signal PS.

In the foregoing embodiments, the electromagnetic valve is shown as an example of the external device, but this invention is not limited to it alone. Whatever the external device may be, if it generates a monitor signal in response to the pulse modulation signal, a failure can be reliably detected by the microcomputer of this invention.

Figure 9:
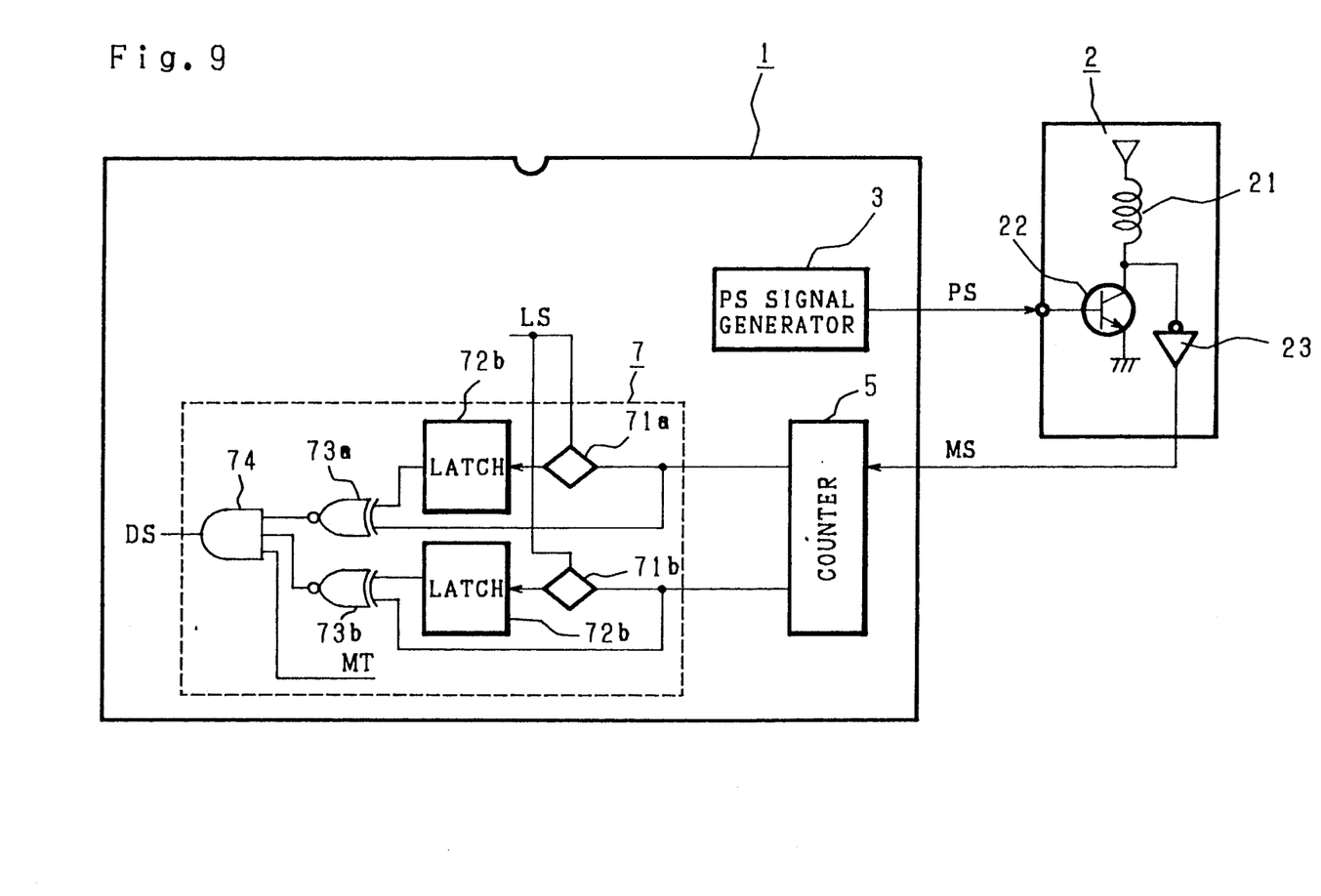
FIG. 9 is a circuit diagram showing the structure of a failure detecting system of a microcomputer according to a still different embodiment of the invention.

In the preceding embodiment, the F/F is arranged in two stages the device is comprised of a counter as shown in FIG. 9, it is similarly possible to cope with the trend of the pulse modulation signals toward high speeds.

Instead of the structure of the circuits employing the hardware as in the description herein, similar effects will be obtained if all functions are performed by software except that of the F/F. In this case, however, it is necessary to add means for reading the held value of the F/F.

Thus, according to the invention, a failure of an external device operating at high speeds can be securely detected by a simple hardware construction, and it is enough to monitor only once within the PWN period. It is not necessary to take into consideration the delay of the individual monitor input signal peculiar to the external device, and thus the load an the software, which is inclined to increase, can be reduced.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A microcomputer for use in detecting failure in an external device, said external device supplying a state signal in response to a pulse signal, comprising:

means for generating a pulse signal for driving said external device;

signal holding means for holding a value in response to said state signal supplied from said external device and indicative of the state of said external device, and updating a holding value at every supplying period wherein the value held in said signal holding means changes state in response to a forward edge of said state signal; and failure detecting means for detecting a failure of said external device by comparing the holding value updated by said holding means with the held value updated one period before.

2. A microcomputer as set forth in claim 1, wherein said signal holding means is comprised of one or plural stages of flip-flops.

3. A microcomputer for use in detecting failure in an external device, said external device supplying a state signal in response to a pulse signal, comprising:

means for generating a pulse signal for driving said external device;

signal holding means for holding a value in response to said state signal supplied from said external device and indicative of the state of said external device, and updating a holding value at every supplying period wherein the value held in said signal holding means changes state in response to a forward edge of said state signal; and failure detecting means for detecting a failure of said external device on the basis of the holding value updated by said holding means; and wherein said signal holding means is comprised of a counter.

4. A method for detecting failure in an external device, said external device receiving a pulse signal with a plurality of pulses defining a plurality of periods of said pulse signal, said external device supplying a state signal in response to said pulse signal, the state signal having a plurality of edges including at least predetermined type of edge, the method comprising toggling a held signal between two states whenever there is said predetermined type of edge in said state signal; and detecting failure by comparing with held value updated one period before to determine whether said held signal inverts at each period of said pulse signal.

5. A method for detecting failure in an external device, said external device receiving a pulse signal with a plurality of pulses defining a plurality of periods of said pulse signal, said external device supplying a state signal in response to said pulse signal, the state signal having a plurality of edges including at least predetermined type of edge, the method comprising toggling a held signal between two states whenever there is said predetermined type of edge in said state signal;

detecting failure by determining whether said held signal inverts at each period of said pulse signal; and wherein said step of detecting includes storing an indication of the value of said held signal and comparing said stored indication to a current value of said held signal.

6. A method, as claimed in claim 5, wherein said storing includes storing in a single latch.

7. A method, as claimed in claim 5, wherein said storing includes storing in at least two latches.

8. Apparatus for use in a device for detecting failure of an external device, said external device receiving a pulse signal, said external device supplying a state signal in response to said pulse signal, the state signal having a plurality of edges including at least predetermined type of edge, the apparatus comprising:

a comparator having an input which determines whether a signal provided at said input is inverted with respect to a previous signal;

an edge detector having an input and an output which toggles the level of a signal at its output between first and second levels in response to detecting an edge of said predetermined type in a signal supplied at said input;

means for supplying said state signal to said input of said edge detector; and means for supplying the signal from the output of said edge detector to the input of the comparator.

9. Apparatus for detecting failure of an external device, said external device receiving a pulse signal, said external device supplying a state signal in response to said pulse signal, the state signal having a plurality of rising edges, the apparatus comprising:

a pulse signal generator having an output coupled to said external device;

a flip-flop having an input and an output which receives said state signal at said input and toggles the level of a held signal at its output between first and second levels in response to a rising edge in said state signal;

at least one latch for storing said held signal received from said flip-flop during one period of said pulse signal;

logic gates for receiving said stored held signal and a current held signal and outputting a detection signal if said stored held signal is not inverted from said current held signal.

* * * * *

REEXAMINATION CERTIFICATE (3889th)

United States Patent
[19]

Sugita et al.

[11] B1 5,243,606

[45] Certificate Issued Oct. 5, 1999

[54] APPARATUS AND METHOD FOR DETECTING FAILURE OF AN EXTERNAL DEVICE BY A MICROCOMPUTER

[75] Inventors: Mitsuru Sugita; Kikuo Muramatsu, both of Itami, Japan

[73] Assignee: Mitsubishi Denki Kabushiki Kaisha, Tokyo, Japan

Reexamination Request:
No. 90/004,781, Oct. 3, 1997

Reexamination Certificate for:
Patent No.: 5,243,606
Issued: Sep. 7, 1993
Appl. No.: 07/455,489
Filed: Dec. 21, 1989

[30] Foreign Application Priority Data

Apr. 28, 1989 [JP] Japan .................................... 1-111141

[51] Int. Cl.[6] .............................. H04L 1/08; H04L 1/00; G06F 7/02
[52] U.S. Cl. .......................................... 714/822; 714/819
[58] Field of Search .................................. 371/69.1, 67.1; 714/822, 819

[56] References Cited

U.S. PATENT DOCUMENTS

| | | | |
|---|---|---|---|
| 3,046,524 | 7/1962 | Johnson et al. | |
| 3,707,714 | 12/1972 | Plumley | 340/347 |
| 3,881,094 | 4/1975 | Taylor et al. | 235/150.2 |
| 4,099,668 | 7/1978 | Feilchenfeld et al. | 235/304 |
| 4,283,766 | 8/1981 | Snyder et al. | 364/525 |
| 4,712,213 | 12/1987 | Warwick et al. | 371/15 |
| 4,817,418 | 4/1989 | Asami et al. | 73/118.1 |
| 4,916,698 | 4/1990 | McCann | 371/16.3 |
| 5,048,017 | 9/1991 | Breneman | 371/16.3 |
| 5,095,483 | 3/1992 | Dubler et al. | 371/25.1 |

FOREIGN PATENT DOCUMENTS

| | | |
|---|---|---|
| 59-133652 (A) | 1/1983 | Japan . |
| 60-17545 (A) | 1/1985 | Japan . |

OTHER PUBLICATIONS

"Adaptive Test Timing Charaterization" IBM Technical Disclosure Bulletin, vol. 27, No. 7A, Dec. 1984.

"Logic Level Detection Using Strobing Detector" IBM Technical Disclosure Bulletin, vol. 27, No. 7B, Dec. 1984.

*Primary Examiner*—Phung My Chung

[57] ABSTRACT

The microcomputer of the invention comprises a flip-flop which repeats setting and resetting of a monitor signal. The monitor signal is delivered from an external device in response to a PWM output signal for driving the external device. The flip-flop sets and resets at the front edge, of the monitor signal. The invention detects a failure of the external device according to the presence or absence of inversion of its held value. Hence, the failure of the external device operating at high speeds can be reliably detected by the microcomputer of the invention.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–9 is confirmed.

\* \* \* \* \*